H. Shepherd,
Seed Drill.

No. 90,200.          Patented May 18, 1869.

Witnesses:          Inventor:

Wm. W. Herthel          Hugh Shepherd

Robert Burns.

United States Patent Office.

HUGH SHEPHERD, OF LEE'S SUMMIT, MISSOURI, ASSIGNOR TO HIMSELF AND GEORGE W. SCOTT, OF SAME PLACE.

Letters Patent No. 90,200, dated May 18, 1869.

IMPROVEMENT IN SEED-DRILLS.

The Schedule referred to in these Letters Patent and making part of the same.

*To all whom it may concern:*

Be it known that I, HUGH SHEPHERD, of Lee's Summit, in the county of Jackson, and State of Missouri, have made certain new and useful Improvements in Seed-Drills; and I do hereby declare that the following is a full and clear description thereof, reference being had to the accompanying drawings, and to the letters of reference marked thereon.

This invention relates to the formation and construction of the flukes, or drill-teeth of the seed-planting machine ordinarily called "seed-drill," and said invention relates, also, to an adaptation of a covering-roller to said flukes; and The object of said improvement is to insure the proper deposit of seed under the surface of the ground, in such wise that frost and other causes may not affect the same, to destroy vegetation.

To enable those skilled herein to make and use my said invention, I will more fully describe the same, referring herein to the accompanying drawings, of which—

Figure 1:
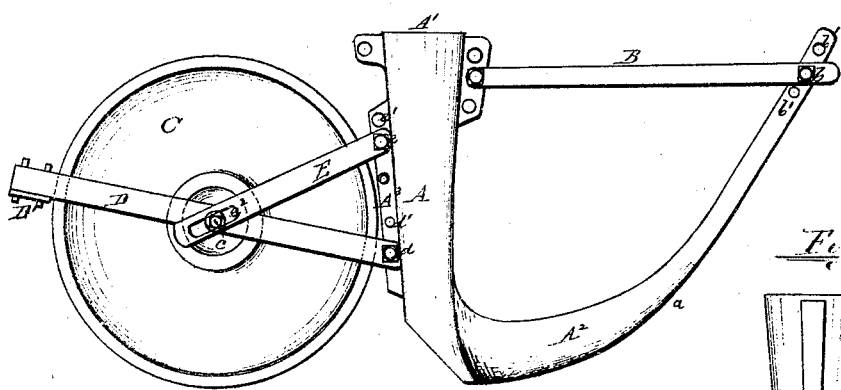
Figure 3:
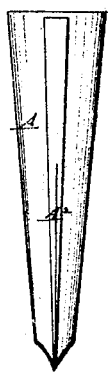
Figure 2:
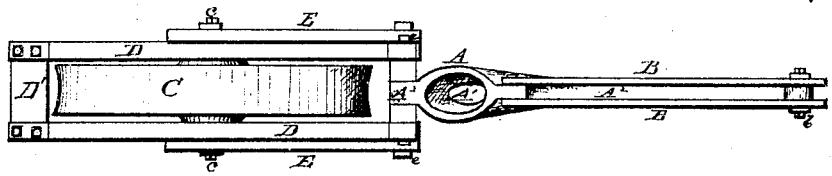

Figure 1 is a general side elevation; and
Figure 2 is a top plan; and
Figure 3 is an elevation, showing the drill-fluke in front view.

I use the ordinary form of frame, supported upon wheels, and attach to said frame the drill-flukes A, generally in the usual manner.

Said flukes are formed of the hollow shank A', which has, in general, the usual construction. In order, however, to insure that the point of the fluke shall properly enter the ground, and thus permit the seed to bury itself to a sufficient depth, and especially to enable the said fluke to enter weedy or trashy soil, which, in the ordinary form of fluke-point, clogs the nose of the fluke, and prevents it from entering the soil, and generally to form a more perfect fluke, I arrange the cutter $A^2$ on the forward edge thereof, having its sharp edge at *a*, so that it may operate to cut or open the fluke-furrow.

In order that the fluke thus formed may be well supported, I arrange the upper end of the cutter $A^2$, to attach to the drag-bar B, by a bolt, *b*. To allow for adjustment, there will be two or more holes, *b'*, through which, by said bolt *b*, the attachment may be made.

As it frequently happens that the seed, in dropping from the drill, falls into an open and non-closing furrow, and thus remains exposed, and is wasted, I have arranged, in connection with said fluke A, the covering-roller C. Said roller has its circumference slightly curved, to form a concave surface, as indicated in fig. 2. Said roller is arranged to follow the fluke A, and to cover the furrow, but its attachment is such that it may readily rise up and roll over inequalities of surface, at the same time that a portion of its weight acts to keep the fluke A properly gauged to the required depth in the furrow.

For said purposes, the attachment of said roller is in the manner following:

A frame, D, composed of two, usually wooden bars, is supported by the bolts *d*, on the rear edge of the fluke A, said fluke having a rib, $A^3$, to furnish said support. In order to adjust this attachment as to height, there will be two or more holes, *d'*, through which the bolt *d* may be put, holding said bar D.

The roller C rests by its journal *c* in said frame D. At the rear end of said frame I arrange a transverse plate, D', usually of iron, which serves, not only to connect the opposite bars of the frame, but also acts as a scraper, to cleanse the roller of adhering soil.

To further support and guide the frame D and roller C, I arrange the braces E, attaching, by the bolt *e*, in one of several holes, $e^1$, in said rib $A^3$, of the fluke A.

The braces E have the slot $e^2$, through which the journal *c*, of the roller C, passes. The slot $e^2$, therefore, permits the roller C to rise up, thereby lifting up the frame D, and pass over obstructions, while always in action upon the soil, to cover the furrow.

By adjusting the braces E and frame D, to attach to higher or lower points of the rib $A^3$, of the fluke, it is apparent that more or less of the weight of the covering-roller C may be hung upon the fluke. In this wise, the depth to which the fluke will enter the ground may be gauged, while, by adjusting the angle of the drag-bar, the said depth can also be gauged in the ordinary manner, and thus the said devices may be effectually adapted to any special nature of soil.

And it is furthermore apparent, that owing to the additional effect produced by the roller-attachment, the gauge of the flukes may, in my said improvement, be more perfectly regulated than in ordinary drills.

Having thus fully described my invention,
What I claim, is—

1. The arrangement of the drill-tooth A, its cutter $A^2$, with the drag-bar B, by the bolt *b* and holes *b'*, substantially as set forth.

2. The braces D and E, arranged adjustably by the bolts *d* and *e*, and holes *d'* and $e^1$, respectively to support and guide the roller C, in connection with the tooth A, substantially as set forth.

In witness whereof, I have hereunto set my hand, in the presence of—

HUGH SHEPHERD.

Witnesses:
GEORGE P. HERTHEL, Jr.,
WM. W. HERTHEL.